United States Patent
Ash et al.

(10) Patent No.: US 10,866,901 B2
(45) Date of Patent: Dec. 15, 2020

(54) INVALIDATING CKD DATA TRACKS PRIOR TO UNPINNING, WHEREIN UPON DESTAGING INVALID TRACK IMAGE FROM CACHE TO A TRACK OF DATA ON STORAGE DRIVE, THE TRACK OF DATA ON THE STORAGE DRIVE IS UNPINNED WHICH ENABLES DESTAGES OF DATA FROM THE CACHE TO THE TRACK OF DATA ON THE STORAGE DRIVE GOING FORWARD

(71) Applicant: International Business Machines Corporation, Armonk, NY (US)

(72) Inventors: Kevin J. Ash, Tucson, AZ (US);
Lokesh M. Gupta, Tucson, AZ (US);
Matthew J. Kalos, Tucson, AZ (US);
Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/996,445

(22) Filed: Jun. 2, 2018

(65) Prior Publication Data

US 2019/0370178 A1    Dec. 5, 2019

(51) Int. Cl.
*G06F 12/0891* (2016.01)
*G06F 12/0868* (2016.01)
*G06F 12/126* (2016.01)

(52) U.S. Cl.
CPC ...... *G06F 12/0891* (2013.01); *G06F 12/0868* (2013.01); *G06F 12/126* (2013.01); *G06F 2212/312* (2013.01)

(58) Field of Classification Search
CPC ............ G06F 12/0891; G06F 12/0868; G06F 12/126; G06F 2212/312; G06F 2212/462;
(Continued)

(56) References Cited

U.S. PATENT DOCUMENTS 5,528,755 A * 6/1996 Beardsley ............. G06F 11/004
714/47.1
5,717,884 A 2/1998 Gzym et al.
(Continued)

FOREIGN PATENT DOCUMENTS

GB    2465474 A1    5/2010

OTHER PUBLICATIONS

Chirkova, Pooja Kohli Rada Y., "Cache Invalidation and Propagation in Distributed Caching," North Carolina State University, Department of Computer Science, Jun. 2010.

*Primary Examiner* — William B Partridge
*Assistant Examiner* — Chie Yew
(74) *Attorney, Agent, or Firm* — Nelson and Nelson; Daniel P. Nelson; Alexis V. Nelson

(57) ABSTRACT

A method for invalidating a track of data on a storage drive in preparation to unpin the track is disclosed. In one embodiment, such a method includes invalidating certain metadata associated with a track of data residing on a storage drive of a storage system. The method further creates, in cache of the storage system, an invalid track image associated with the track. The method destages, from the cache, the invalid track image to the storage drive. Once the invalid track image is destaged, the method may unpin the track in cache, thereby enabling destages of the track from the cache to the storage drive going forward. A corresponding system and computer program product are also disclosed.

20 Claims, 5 Drawing Sheets

(58) Field of Classification Search
CPC ......... G06F 2212/466; G06F 2212/261; G06F 2212/154; G06F 2212/282
See application file for complete search history.

(56) References Cited

U.S. PATENT DOCUMENTS

| | | | |
|---|---|---|---|
| 7,380,059 | B2 | 5/2008 | Burton |
| 9,092,337 | B2 | 7/2015 | Nellans et al. |
| 9,251,086 | B2 | 2/2016 | Peterson et al. |
| 9,405,476 | B2 | 8/2016 | Joshi et al. |
| 9,405,669 | B2 | 8/2016 | Ash et al. |
| 9,767,032 | B2 | 9/2017 | Talagala et al. |
| 2005/0273555 | A1* | 12/2005 | Factor ................. G06F 12/0804 711/113 |
| 2007/0294589 | A1* | 12/2007 | Jarvis ................. G06F 11/1435 714/42 |

* cited by examiner

INVALIDATING CKD DATA TRACKS PRIOR TO UNPINNING, WHEREIN UPON DESTAGING INVALID TRACK IMAGE FROM CACHE TO A TRACK OF DATA ON STORAGE DRIVE, THE TRACK OF DATA ON THE STORAGE DRIVE IS UNPINNED WHICH ENABLES DESTAGES OF DATA FROM THE CACHE TO THE TRACK OF DATA ON THE STORAGE DRIVE GOING FORWARD

BACKGROUND

Field of the Invention

This invention relates to systems and methods for invalidating CKD data tracks on storage drives such as disk drives prior to unpinning the data tracks.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, etc.). The memory may include a cache, such as a DRAM cache. Whenever a host (e.g., an open system or mainframe server) performs a read operation, the server that performs the read may fetch data from the storage drives and save it in its cache in the event it is required again. If the data is requested again by a host, the server may fetch the data from the cache instead of fetching it from the storage drives, saving both time and resources. Similarly, when a host performs a write, the server that receives the write request may store the write in its cache, and destage the write to the storage drives at a later time. When a write is stored in cache, the write may also be stored in persistent non-volatile storage (NVS) of the opposite server so that the write can be recovered by the opposite server in the event the first server fails.

Despite the redundancy that is built into the storage system, there are still some errors or failures that may cause data loss. For example, a dual hardware failure may occur in the storage system that causes both the cache and NVS to malfunction when data is written (or attempted to be written) thereto. This dual hardware failure may cause loss of modified data in the cache and NVS before it can be destaged to the storage drives. In such cases, the modified data may be unrecoverable since the data is not present in either the cache, NVS, or storage drives.

When a situation such as that described above occurs, the data track may be marked as "pinned non-retryable" in various data structures of the storage system to indicate that the data track is lost and unrecoverable, and to prevent a host system from trying to access the data track on the storage drives, which may only store a previous, non-current version of the data track (also referred to herein as "down-level" data). The "pinned non-retryable" status may prevent a host system from accessing the data track on the underlying storage drives until the track is "unpinned." Unfortunately, as will be explained in more detail hereafter, when "unpinning" a data track, situations (e.g., errors or failures) may occur that may cause a track to be considered "unpinned" even when underlying operations needed to actually unpin the track have not completed. This may create a situation where a host system believes a track on the storage drives is the current or latest version of the data when in reality it is a previous, non-current version.

In view of the foregoing, what are needed are systems and methods to ensure that a host system does not mistakenly believe that down-level data is the correct and most recent version of the data. Further needed are systems and methods to prevent a track from being considered "unpinned" even when underlying operations needed to unpin the track have not completed.

SUMMARY

The invention has been developed in response to the present state of the art and, in particular, in response to the problems and needs in the art that have not yet been fully solved by currently available systems and methods. Accordingly, systems and methods have been developed to invalidate a track of data on a storage drive in preparation to unpin the track. The features and advantages of the invention will become more fully apparent from the following description and appended claims, or may be learned by practice of the invention as set forth hereinafter.

Consistent with the foregoing, a method for invalidating a track of data on a storage drive in preparation to unpin the track is disclosed. In one embodiment, such a method includes invalidating certain metadata associated with a track of data residing on a storage drive of a storage system. The method further creates, in cache of the storage system, an invalid track image associated with the track. The method destages, from the cache, the invalid track image to the storage drive. Once the invalid track image is destaged, the method may unpin the track in cache, thereby enabling destages of the track from the cache to the storage drive going forward.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
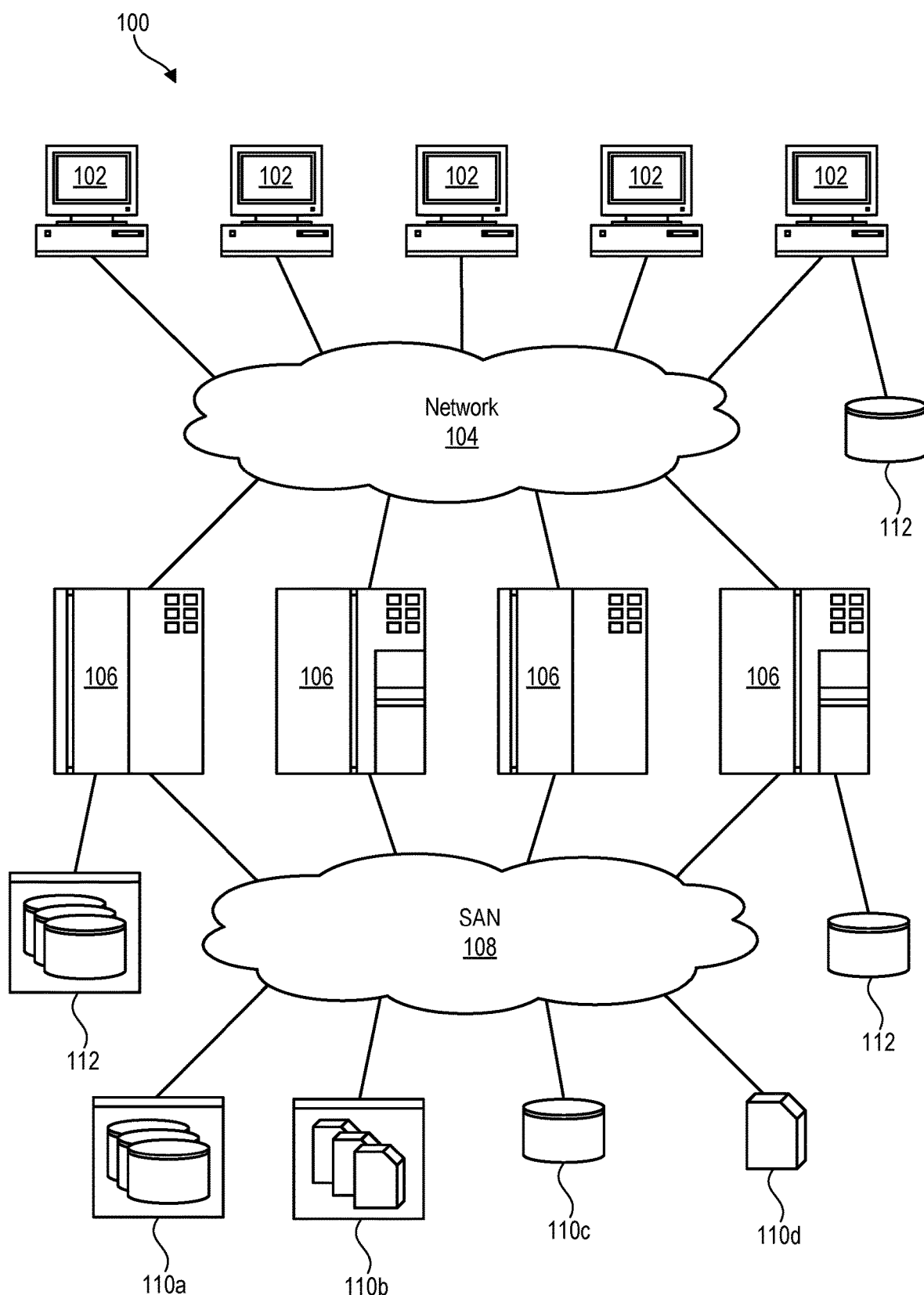
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
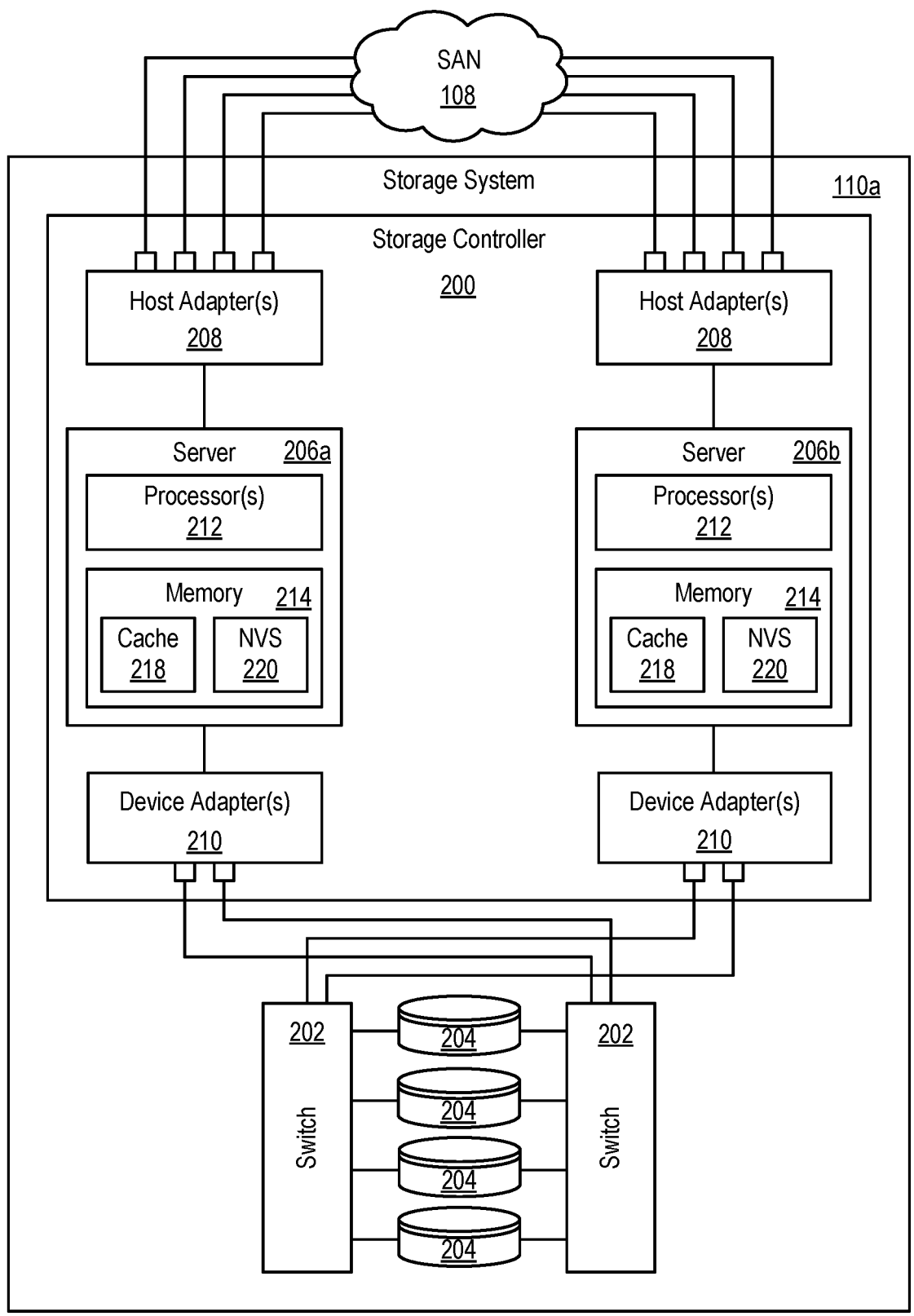
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems or groups of storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy and ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
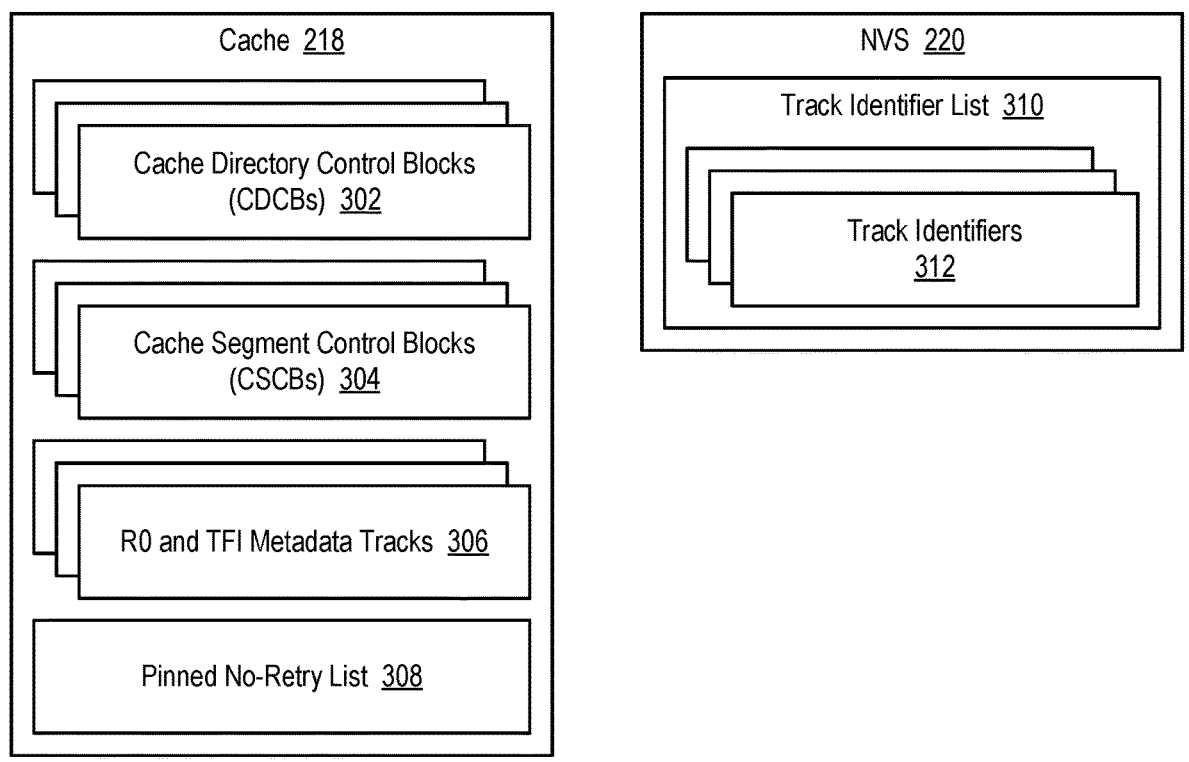
FIG. 3 is a high-level block diagram showing various data structures in the cache and non-volatile storage (NVS) of the storage system of FIG. 2.

Referring to FIG. 3, while continuing to refer generally to FIG. 2, as previously mentioned, despite the redundancy that is built into a storage system 110a, there are still some errors or failures that may cause data loss. For example, a dual hardware failure may occur in the storage system 110a that causes both the cache 218 and NVS 220 to malfunction when data is written (or attempted to be written) thereto. Such a dual hardware failure may cause loss of modified data in the cache 218 and NVS 220 before it can be destaged to the storage drives 204. In such cases, the modified data may be unrecoverable since the modified data is not present in any of the cache 218, NVS 220, or storage drives 204.

When a hardware failure such as that described above occurs, the data track that was lost may be marked as "pinned non-retryable" to indicate that the track is lost and unrecoverable, and to prevent a host system 106 from trying to access the track on the storage drives 204, which may only store a previous, non-current version of the data (also referred to herein as "down-level" data). The "pinned non-retryable" status may indicate that the track cannot be destaged from cache 218 to the storage drives 204, and may prevent a host system 106 from accessing the data track on the storage drives 204 until the track is "unpinned." Unfortunately, as will be explained in more detail hereafter in association with FIG. 4, when "unpinning" a track, situations (e.g., errors or failures) may occur that may cause a track to be considered "unpinned" even when underlying operations needed to actually unpin the track have not been performed. This may create a situation where a host system 106 believes a track on the storage drives 204 is the current or latest version when in reality it is a previous, non-current version of the track.

Thus, systems and methods are needed to ensure that a host system 106 does not mistakenly believe that down-level data is a correct and most recent version of the data. Systems and methods are further needed to prevent situations where a track is considered "unpinned" even when underlying operations needed to unpin the track have not completed.

When storing Count Key Data (CKD) and more particularly a track of CKD data, the storage system 110*a* maintains a Cache Directory Control Block 302 (CDCB 302) and Cache Segment Control Block 304 (CSCB 304) in the cache 218 to store information about the track. The storage system 110*a* may also maintain a track identifier list 310 in the NVS 220 of the opposite server 206. The track identifier list 310 may contain track identifiers 312 for modified metadata tracks in the cache 218 that may be lost if a failover or reboot occurs. The track identifier list 310 may also contain track identifiers 312 for CKD data tracks that have been reported lost and marked as pinned non-retryable in the track's CDCB 302.

When a modified CKD track in cache 218 has been reported lost and marked as pinned non-retryable in the track's CDCB 302, the previous version of the track may nevertheless remain intact on the storage drives 204 of the storage system 110*a*, even though access to the track may be prohibited as a result of it being pinned. In such cases, the CDCB 302 for the lost track may be placed on a pinned no-retry list 308 in the cache 218, and the track identifier may be added to the track identifier list 310 in the NVS 220 of the opposite server 206. Access to the previous version of the data is not permitted until the track becomes unpinned.

There are typically two ways to unpin a track in cache 218. The first way is to discard the pinned track from the cache 218. This procedure may be manually performed by a field engineer, or performed by a host system 106 that issues a command to the storage system 110*a* to discard the pinned data. This procedure will remove the track identifier from the track identifier list 310 in the NVS 220 and discard the CDCB/CSCB associated with the track from the cache 218. Any subsequent access to the track will be allowed. More specifically, any subsequent access to the track will cause the track (which is the previous version of the track) to be staged from the underlying storage drives 204 to the cache 218 for access by a host system 106.

Figure 4:
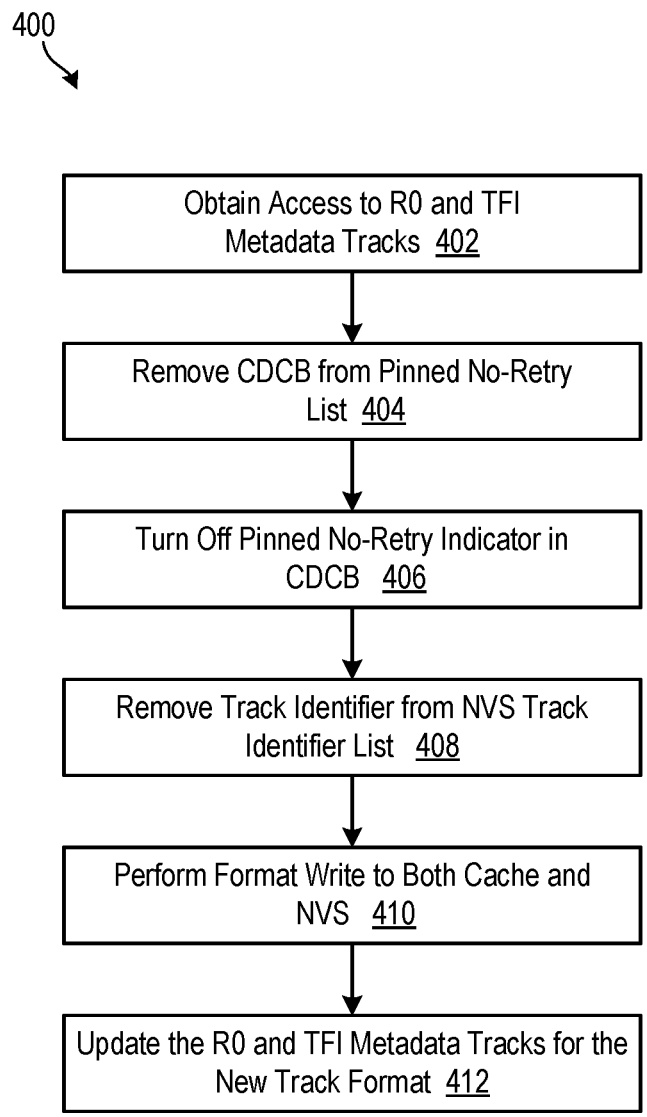
FIG. 4 is a process flow diagram showing a conventional process for unpinning a track and performing a format write operation to the track.

The other way to unpin a track in cache 218 is to perform a full-track format write operation to the track. Using this technique, the host system 106 may overwrite all records of the track on the underlying storage drives 204 with a reconstructed or current version of the data, starting at record 0 or record 1 within the track. A conventional process for performing a full-track format write operation is illustrated in FIG. 4. As shown in FIG. 4, the process 400 initially obtains 402 access to two types of metadata tracks (i.e., RO and TFI (track format information) metadata tracks) that describe the format of track. The process 400 then removes 404 the CDCB 302 associated with the track from the pinned no-retry list 308 in cache 218, and turns off 406 the indicator in the CDCB 302 that indicates that the track is pinned non-retryable. The process 400 also removes 408 the track identifier associated with the track from the track identifier list 310 in the NVS 220.

The process 400 then performs 410 the full-track format write operation to both the cache 218 and NVS 220. In certain embodiments, the data that is written to the track is a copy of the data that was stored at a secondary location (e.g., a PPRC secondary location) or some other valid copy of the data. At this point, the new and/or modified data will be stored in the track. The data in this track may then be destaged from the cache 218 to the storage drives 204 so that the storage drives 204 also store the new and/or modified data. Now that the new format of the track is written and known, the process 400 updates 412 the RO and TFI metadata tracks to reflect the new track format.

Once a track is removed from the track identifier list 310 in the NVS 220 at step 408, a storage system 110*a* such as the IBM DS8000™ enterprise storage system may no longer have any knowledge that the data track on the storage drives 204 is down-level (i.e., a previous non-current version of the data). In some instances, errors may occur during the format write operation that can prevent the operation from completing. If a warmstart or failover event occurs, the host system 106 is typically expected to re-drive the format write operation. However, if a storage system reboot occurs, the host system 106 may have no chance to re-drive the operation until the storage system 110*a* undergoes and completes an initial microcode load (IML) sequence. Following the IML of the storage system 110*a*, the host system 106 may begin processes to recover from the IML of the storage system 110*a*. This may involve reading from the storage drives 204, which may result in using down-level data which may not be the correct or most current version of the data. Thus, in certain scenarios, use of the process 400 illustrated in FIG. 4 may result in a host system 106 mistakenly believing that down-level data is a current version of the data when in reality it is not. This is because the track may be considered "unpinned" even when underlying operations needed to unpin the track have not been performed to completion.

In order to prevent such situations from occurring, various steps may be inserted into the process 400 of FIG. 4. These steps may ensure that a host system 106 does not mistakenly believe that down-level data is a current recent version of the data when in fact it is not. These new steps may also prevent situations where a track is considered "unpinned" even when underlying operations needed to unpin the track have not completed. These new steps are shown in bold text in FIG. 5.

Figure 5:
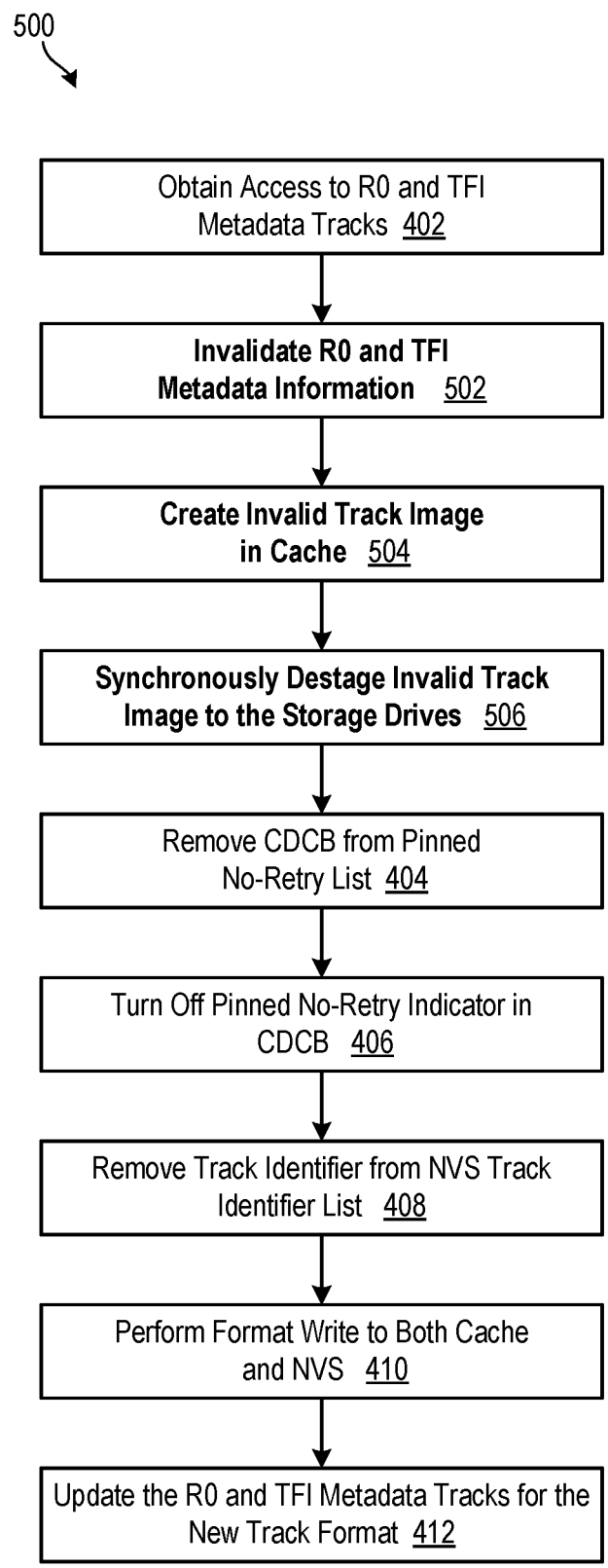
FIG. 5 is a process flow diagram showing an improved process for unpinning a track and performing a format write operation to the track.

As shown in FIG. 5, in certain embodiments in accordance with the invention, various steps 502, 504, 506 may be added to the process 400 of FIG. 4. After obtaining 402 access to the RO and TFI metadata tracks, the improved process 500 may invalidate 502 information in the RO and TFI metadata tracks, which will essentially delete or invalidate any description of the format of the lost track. The process 500 may then create 504 an invalid track image in cache 218. In certain embodiments, this may be accomplished by inserting certain record headers in the invalid track image that will enable a host system 106 to recognize that the track is invalid, and also writing zeros or other invalid data to the remainder of the track image where data would normally be stored. The process 500 may then synchronously destage the invalid track image from the cache 218 to the storage drives 204. This will overwrite or replace the previous version of the track in the storage drives 204. With the addition of steps 502, 504, 506, if an error or failure occurs during any of the steps illustrated in FIG. 5, the cache 218 and NVS 220 will still contain information indicating that the track is pinned non-retryable, or the track on the storage drives 204 will be invalid and thus not usable by a host system 106.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:
    invalidating certain metadata that is associated with a track of data on a storage drive of a storage system;
    creating, in cache of the storage system, an invalid track image associated with the track of data on the storage drive;
    destaging, from the cache, the invalid track image to the track of data on the storage drive; and
    unpinning, the track of data on the storage drive, thereby enabling destages of data from the cache to the track of data on the storage drive going forward.

2. The method of claim 1, wherein unpinning the track of data on the storage drive comprises removing a Cache Directory Control Block (CDCB) associated with the track from a no-retry list maintained in the cache.

3. The method of claim 1, wherein unpinning the track of data on the storage drive comprises removing a no-retry indicator from a Cache Directory Control Block (CDCB) associated with the track.

4. The method of claim 1, wherein unpinning the track of data on the storage drive comprises removing a track identifier associated with the track from a track identifier list maintained in non-volatile storage (NVS).

5. The method of claim 1, further comprising, after unpinning the track of data on the storage drive, performing a format write operation to the track.

6. The method of claim 5, wherein performing the format write operation comprises performing the format write operation in both the cache and non-volatile storage (NVS).

7. The method of claim 5, further comprising, in response to performing the format write operation, updating the certain metadata to reflect a new format of the track.

8. A computer program product comprising a computer-readable storage medium having computer-usable program code embodied therein, the computer-usable program code configured to perform the following method when executed by at least one processor:
    invalidating certain metadata that is associated with a track of data on a storage drive of a storage system;
    creating, in cache of the storage system, an invalid track image associated with the track of data on the storage drive;
    destaging, from the cache, the invalid track image to the track of data on the storage drive; and
    unpinning, the track of data on the storage drive, thereby enabling destages of data from the cache to the track of data on the storage drive going forward.

9. The computer program product of claim 8, wherein unpinning the track of data on the storage drive comprises removing a Cache Directory Control Block (CDCB) associated with the track from a no-retry list maintained in the cache.

10. The computer program product of claim 8, wherein unpinning the track of data on the storage drive comprises removing a no-retry indicator from a Cache Directory Control Block (CDCB) associated with the track.

11. The computer program product of claim 8, wherein unpinning the track of data on the storage drive comprises removing a track identifier associated with the track from a track identifier list maintained in non-volatile storage (NVS).

12. The computer program product of claim 8, wherein the computer-usable program code is further configured to, after unpinning the track of data on the storage drive, perform a format write operation to the track.

13. The computer program product of claim 12, wherein performing the format write operation comprises performing the format write operation in both the cache and non-volatile storage (NVS).

14. The computer program product of claim 12, wherein the computer-usable program code is further configured to, in response to performing the format write operation, update the certain metadata to reflect a new format of the track.

15. A system comprising:
    at least one processor;
    at least one memory device operably coupled to the at least one processor and storing instructions for execution on the at least one processor, the instructions causing the at least one processor to perform the following method:
    invalidating certain metadata that is associated with a track of data on a storage drive of a storage system;
    creating, in cache of the storage system, an invalid track image associated with the track of data on the storage drive;
    destaging, from the cache, the invalid track image to the track of data on the storage drive; and
    unpinning, the track of data on the storage drive, thereby enabling destages of data from the cache to the track of data on the storage drive going forward.

16. The system of claim 15, wherein unpinning the track of data on the storage drive comprises removing a Cache Directory Control Block (CDCB) associated with the track from a no-retry list maintained in the cache.

17. The system of claim 15, wherein unpinning the track of data on the storage drive comprises removing a no-retry indicator from a Cache Directory Control Block (CDCB) associated with the track.

18. The system of claim 15, wherein unpinning the track of data on the storage drive comprises removing a track identifier associated with the track from a track identifier list maintained in non-volatile storage (NVS).

19. The system of claim 15, wherein the instructions further cause the at least one processor to, after unpinning the track of data on the storage drive, perform a format write operation to the track.

20. The system of claim 19, wherein performing the format write operation comprises performing the format write operation in both the cache and non-volatile storage (NVS).

* * * * *